United States Patent [19]

Hiller et al.

[11] 4,436,082

[45] Mar. 13, 1984

[54] ASSEMBLY FOR STEAM HEATING OR COOKING FOOD PRODUCTS AND ITS METHOD OF OPERATION

[76] Inventors: Jeffrey H. Hiller; Stephen S. Hiller, both of 1300 Hancock St., Redwood City, Calif. 94063

[21] Appl. No.: 316,131

[22] Filed: Oct. 29, 1981

[51] Int. Cl.³ .............................................. F24D 1/00
[52] U.S. Cl. .................................... 126/348; 126/20; 126/369.2; 99/477
[58] Field of Search ...................... 126/20, 348, 369.2, 126/1 B, 1 E, 5, 41 D, 41 A, 41 E; 99/330, 477

[56] References Cited

U.S. PATENT DOCUMENTS

| | | | |
|---|---|---|---|
| 921,041 | 5/1909 | Williams | 126/369.2 |
| 2,750,937 | 6/1956 | Sjölund | 126/369.2 |
| 3,643,587 | 2/1972 | Harrington et al. | 99/477 |
| 3,949,733 | 4/1976 | Miller et al. | 126/348 |
| 4,281,636 | 8/1981 | Vegh et al. | 126/348 X |
| 4,309,938 | 1/1982 | Harmon | 99/477 |

*Primary Examiner*—Larry Jones
*Attorney, Agent, or Firm*—Flehr, Hohbach, Test, Albritton & Herbert

[57] ABSTRACT

An assembly for steam heating or cooking given food products, particularly hot dogs and buns, is disclosed herein along with its method of operation. The assembly includes a housing having at least one internal cooking chamber, a chamber inlet door a vertically lower chamber outlet door and a downhill ramp extending between the two doors within the chamber. The ramp serves to support one or more food supporting trays successively placed in the chamber while the latter is maintained at a preset temperature by introducing steam therein in a controlled fashion. All of the trays within the chamber move down the ramp one at a time, toward the exit door and are removed from the chamber, again one at a time, in the order in which they were placed therein. This assures that one tray does not remain in the chamber too long while another is taken out too soon.

20 Claims, 5 Drawing Figures

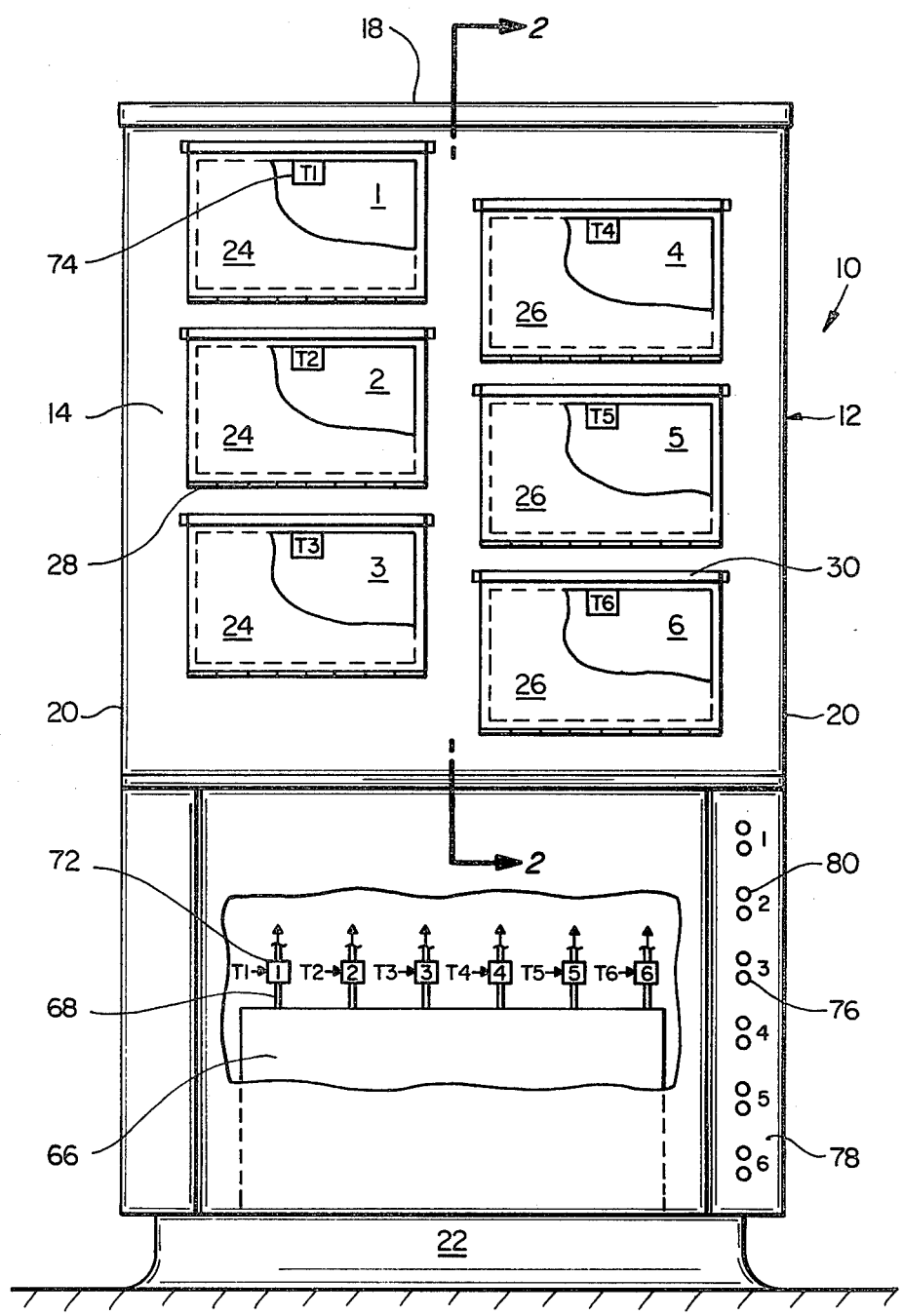
FIG_1

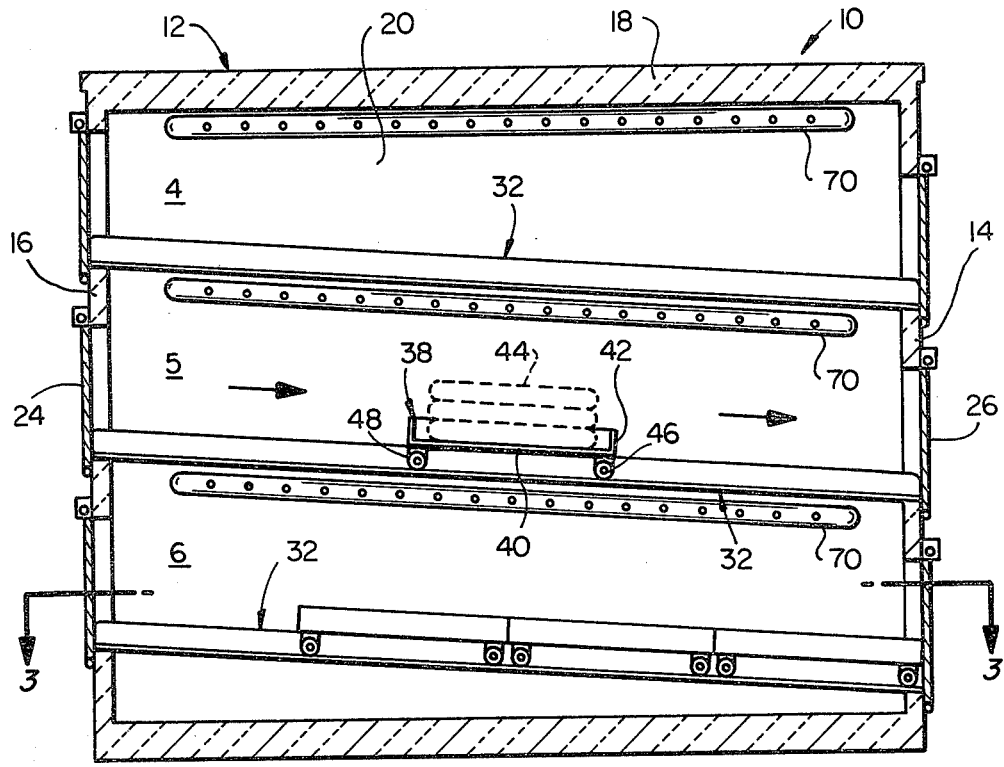
FIG_2
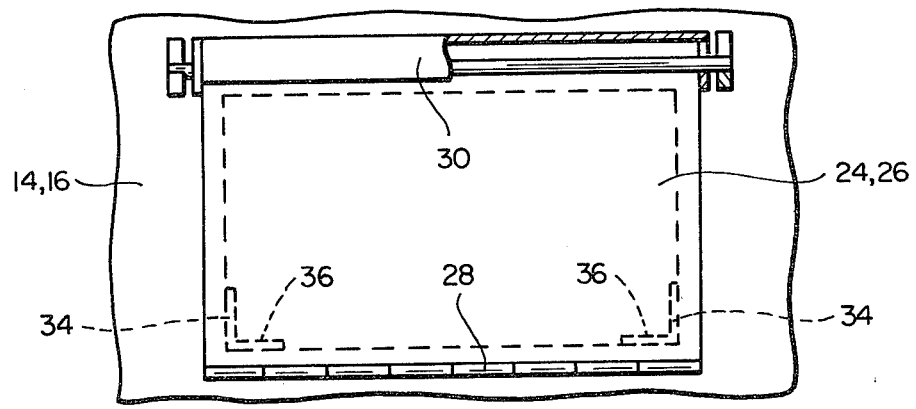
FIG_4

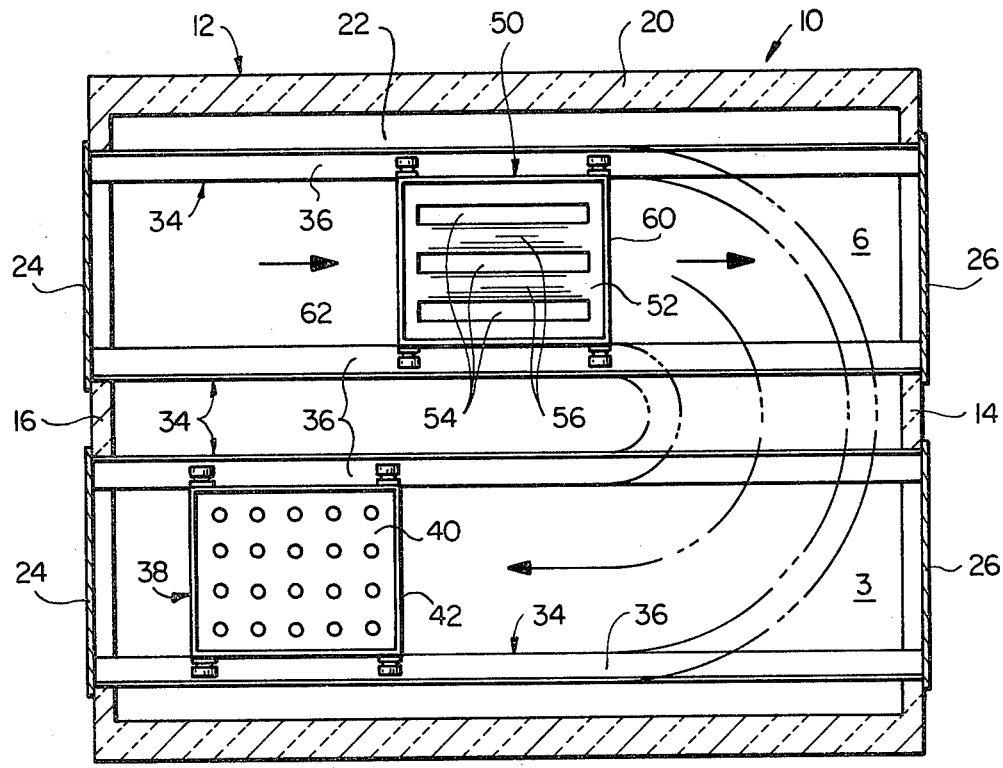
FIG_3
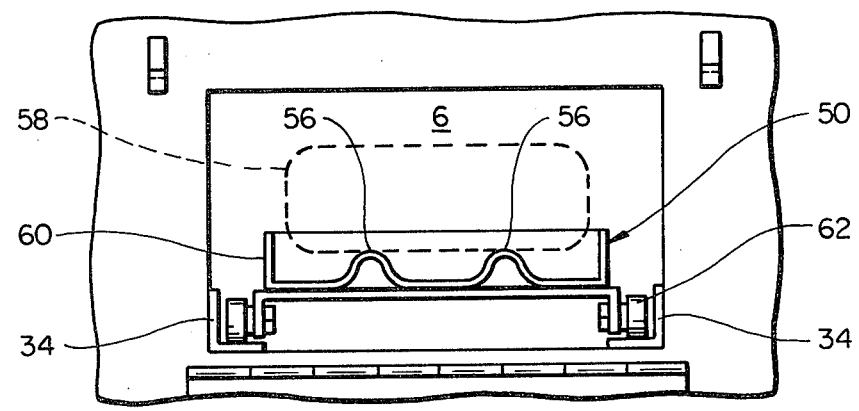
FIG_5

ASSEMBLY FOR STEAM HEATING OR COOKING FOOD PRODUCTS AND ITS METHOD OF OPERATION

The present invention relates generally to techniques for steam heating or cooking food products and more particularly to a specific assembly for and method of steam heating hot dogs and their associated buns to certain preset temperatures.

Those who are in the business of selling hot dogs for immediate consumption know that the hot dog meat tastes best when eaten at a particular temperature, specfically 150° F. At the same time, the buns should be eaten at a different temperature, specifically, 170° F. However, in actual practice, this is not always carried out. More often than not, the hot dog and its bun are heated together in a "steamer" and served at the same temperature which is controlled generally but not very accurately. More specifically, the steamer typically used is one which includes a chamber for containing a supply of hot dogs and buns and means for continuously supplying steam to the chamber from boiling water. The temperature in the steamer is controlled by controlling the temperature of the steam which, in turn, is regulated by controlling the temperature of the boiling water.

There are a number of disadvantages to using steamers of the type just recited. One primary disadvantage resides in the fact that the temperature of the steam determines the temperature of the steam chamber. Since the temperature of the steam is dependent upon the temperature of its source, that is, the boiling water, it is difficult to accurately maintain its temperature at a predetermined value. Moreover, should the temperature within the steam chamber drop substantially through heavy use, for example because a larger than usual number of cold hot dogs are initially placed therein, it is a relatively slow process to bring the chamber temperature back up to the desired operating level. This is because the temperature of the steam is no higher than the desired operating temperature of the chamber and therefore does not contain excess heat to provide rapid temperature changes. In order to add excess heat to the steam, the temperature of the boiling water would have to be raised to a temperature above the operating temperature of the chamber and this would itself be a slow process.

Another disadvantage to steamers of the type described also relates to the fact that the chamber temperature is operated at and is dependent on the temperature of the steam used to heat it. Because of this, both the hot dogs and buns are heated to the same temperature and this is generally the case even when separate chambers are provided.

Still another disadvantage of steamers of the type described relates particularly to those which utilize the same door for placing hot dogs and buns into and removing them from the steam chamber, which is often the case. Because of this, it is not always possible to ensure that the hot dogs and buns are removed from the chamber in the order in which they were placed therein. Thus, some hot dogs might stay in too long and become overheated and others may be taken out too soon and thereby never reach the desired temperature.

In view of the foregoing, it is one object of the present invention to provide an assembly for and method of steam heating or cooking given food products utilizing a steam chamber which can be accurately maintained at a particular predetermined temperature in a reliable and yet uncomplicated manner.

Another object of the present invention is to be able to bring the temperature of the steam chamber just recited back up to its preset level in a rapid fashion should the chamber temperature drop substantially for the reasons discussed previously.

Still another object of the present invention is to provide an uncomplicated, reliable and yet economical assembly for and method of steam heating or cooking given food products, especially hot dogs and buns, utilizing a number of different steam chambers simultaneously maintained at different temperatures, whereby different food products, for example, the hot dogs and buns mentioned, can be maintained at different temperatures.

Yet another object of the present invention is to provide a steam heating or cooking assembly which is designed to assure that the hot dogs and buns or like food products being steam heated or cooked are removed from their associated steam chamber in the order in which they were placed therein.

As will be described in more detail hereinafter, the particular steamer disclosed herein is one which includes an overall housing having at least one but preferably a number of internal cooking chambers and means for providing a supply of steam, for example, a suitable steam boiler. In accordance with one aspect of the present invention, each cooking chamber includes means such as a thermostat for sensing the temperature therein and the overall assembly includes means responsive to the temperature within each chamber for directing steam therein when and only when the temperature in that particular chamber is below a preset value, whereby to raise the chamber temperature to the preset value for heating or cooking the food products therein at that temperature. In accordance with another aspect of the present invention, the steamer includes a number of cooking chambers which are independently maintained at different temperatures utilizing the steam heating procedure just described. In this way, food products such as hot dogs and buns can be heated to different temperatures which, as stated previously, may be desirable.

Still another aspect of the present invention resides in the particular way in which each cooking chamber is designed. More specifically, as will be seen hereinafter, each chamber includes separate entry and exit doors and means within the chamber for guiding successive trays carrying given food products through the chamber from its entry door towards it exit door. This ensures that the food products are removed from the chamber in the order in which they were placed therein. In the case of hots dogs and buns, the trays used for carrying the buns are specifically designed to prevent puddles of water thereon (as a result of condensation) from coming into direct contact with buns.

The overall steamer assembly and its method of operation will be described in more detail in conjunction with the drawings wherein:

FIG. 1 is a partially broken away front elevational view of the steamer designed in accordance with the present invention;

FIG. 2 is a side sectional view, in elevation, of a portion of the assembly illustrated in FIG. 1, taken generally along line 2—2 in FIG. 1;

FIG. 3 is a downwardly directed sectional view of the assembly illustrated in FIG. 1, taken generally along line 3—3 in FIG. 2;

FIG. 4 is an enlarged, partially broken away side elevational view of an entry or exit door forming part of the assembly of FIG. 1; and FIG. 5 is a view similar to FIG. 4 but without the presence of the door.

Turning now to the drawings, wherein like components are designated by like reference numerals throughout the various figures, attention is first directed to FIG. 1 which shows an overall assembly 10 for steam heating or cooking given food products in accordance with the present invention. This assembly is especially suitable for simultaneously steam heating hot dogs to one preset but adjustable temperature and buns at a different preset but adjustable temperature. In an actual working embodiment, the hot dogs are heated to a precise temperature, for example 190° F., and the buns are heated to a precise temperature, for example 208° F. While these particular temperatures are not intended to limit the present invention, they have been selected based on the average temperature drop of the hot dog before it is consumed, that is, the average time it takes a customer to begin eating the hot dog from the time it leaves the steamer, so that he eats the meat at 150° F. and the bun at 170° F. Because overall assembly 10 is especially suitable for steam heating precooked hot dogs and buns, it will be described hereinafter for that purpose. However, it is to understood that the various inventive aspects of the assembly may be equally suitable for cooking other food products.

As illustrated best in FIGS. 1-3, overall assembly 10 includes a main housing 12 having what may be referred to as a vertically extending front side 14 and an opposite vertically extending back side 16 as well as a closed top surface 18, opposite sidewalls 20 and a bottom support base 22. An upper section of housing 12 contains six separate internal heating chambers 1-6 which extend from front side 14 to back side 16 adjacent to but isolated from one another by suitable partitions. Each of the chambers 1, 2, and 3 includes an entry door 24 on front side 16 and a vertically lower exit door 26 on back side 16. On the other hand, each of the chambers 4, 5 and 6 includes an entry door on back side 16 and vertically lower exit dooor on front side 14. In this way, hot dogs and buns can be simultaneously placed into and removed from the various chambers from opposite sides of the overall assembly, as will be seen hereinafter. Each entry or exit door is preferably rectangular in shape, and pivotally connected by suitable means such as hinges 28 at its bottom end to front side 14 or back side 16. In this way, each door opens downward to provide additional work surface when its associated chamber is opened. In a preferred embodiment, the hinges 28 or like means also serve to bias their respective entry and exit doors in closed positions. Each door includes its own handle 30 along a top edge thereof.

Referring specifically to FIG. 2, each of the chambers 4, 5 and 6 is shown including a ramp generally indicated at 32 extending downward through the chamber from a point adjacent its associated entry door 24 to a point adjacent its associated exit door 26. The ramp in chamber 6 is shown in plan view in FIG. 3. As seen there in conjunction with FIG. 5. the ramp is shown actually comprised of two right angle flanges 34 which are fixedly connected on opposite sides of the chamber along the bottom longitudinally extending edges thereof so as to provide a pair of upwardly facing ramped surfaces 36 extending downhill from entry door 34 towards exit door 26. While these flanges are satisfactory, in a preferred embodiment, they are not used. Rather, the bottom of the chamber is entirely flat and serves as the ramp surface. In either case, the ramps in the chambers 4 and 5 are preferably identical to the ramp in chamber 6 and therefore have identical ramped surfaces. While not shown, each of the chambers 1, 2, 3 includes an identical ramp comprised of its bottom surface or individual flanges having upwardly facing ramp surfaces. However, the ramps in chambers 1, 2 and 3 extend downward in the opposite directions. This is because the entry doors associated with chambers 1-3 are on the front side of the housing and the entry doors associated with chambers 4-6 are on the housing's back side, as discussed previously.

Having described each of the chambers 1-6, attention is now directed to the way in which hot dogs and buns are contained within these chambers. To this end, overall assembly 10 includes a number of trays which, as will be seen, are designed to support either a number of hots dogs or a package of buns for movement through a given chamber along an associated ramp from its entry door to its exit door. In a preferred embodiment, the trays for supporting hot dogs are designed slightly different than the trays used for supporting a package of buns. One hot dog tray is shown in chamber 5 (see FIG. 2) and another identical tray is shown in chamber 3 (see FIG. 3). Each of these trays which is generally indicated at 38 includes a flat support base 40 which is perforated to allow steam to pass therethrough. An upwardly extending rim 42 extends entirely around base 40 for preventing hot dogs (shown at 44 in FIG. 2) from inadvertently falling off the base. The combination base and rim are supported on four wheels 46 supported to the underside of the base by suitable support flanges 48. As best illustrated in FIG. 3, the tray is sized relative to its associated chamber such that two of the wheels ride on one ramp surface 36 while the other two wheels ride on the opposite ramp surface. In this way, the entire tray will automatically move by its own weight down the ramp from the entry door to and against the inside of the exit door. If the bottom surface of the chamber is used as the ramp, then two wheels 46 ride on one longitudinal edge section of the bottom surface while the other two wheels ride on an opposite longitudinal edge section.

While the trays used to support buns rather than hot dogs may be identical to trays 38, in a preferred embodiment of the present invention, they are slightly different. One such tray is shown in chamber 6 and generally designated by the reference number 50 (see FIGS. 3 and 5). This particular tray also includes a base 52 having three elongated through slots 54 which together define two spaced apart elongated base sections 56. As best illustrated in FIG. 5, each of these elongated sections projects upwardly relative to the rest of the base. In this way, a package of hot dog buns indicated by dotted lines at 58 is supported above and spaced from the rest of the base. Therefore, should any water accumulate on the base as a result of condensation within the steam chamber, the package of buns will be supported out of contact with the water. The remaining features of tray 50 may be identical to tray 38. More specifically, tray 50 may also include an upwardly extending rim 60 extending entirely around base 52 and four wheels 62 connected with and supporting the base for rolling movement down its associated ramp.

Referring specifically to FIG. 2, chamber 6 illustrated there is shown including a number of trays located in the chamber in a train-like end-to-end fashion. This resulted from putting the lowermost tray (the one closest to the exit door) into a chamber 6 through its entry door first and thereafter the next successive trays, each automatically moving down the ramp towards the exit door. It should be apparent from FIG. 2 that the first tray placed into the chamber is the first one to be taken out of the chamber, and so on, assuring that all of the trays are removed from the chamber in the order in which they were placed therein. In this regard, it is important that the hot dogs and buns (or other such food products) remain in their cooking chambers sufficiently long to heat up to the intended temperatures but not so long as to overcook otherwise the present process is independent of temperature.

Having now described the various trays and the way in which they move through corresponding steam chambers, attention is now directed to the way in which each chamber is independently steam heated for heating (or cooking) the hot dogs or buns therein. To this end, overall assembly 10 includes a steam boiler 66 which may be of any suitable, conventional type capable of providing a supply of steam from boiling water sufficient to heat all of the chambers in the manner to be described. The boiler may be operated electrically or by means of natural gas which is typically the case and is required to provide steam at a constant temperature at least as hot as the hottest chamber. In a preferred embodiment, boiler 66 provides a continuous supply of steam at about 275° F. As will be seen below, suitable plumbing is provided for independently directing steam from boiler 66 to each of the chambers in a controlled fashion so as to maintain each chamber at a constant, preset but readily adjustable temperature, e.g. at 195° F. in the case of a hot dog chamber and 208° F. in the case of a bun chamber. For purposes of convenience, the boiler itself is contained within housing 12 directly under the chambers as best illustrated in FIG. 1, although this does not necessarily have to be the case. The boiler could be located at a remote location.

The plumbing and associated components for controlling the temperature in each cooking chamber includes suitable steam lines 68 extending from the boiler (actually a common manifold not shown) to the respective cooking chambers. Since there are six chambers illustrated, six steam lines are shown. In a preferred embodiment, each of the chambers includes its own elongated distribution plenum 70 which extends the length of the chamber and which is connected in fluid communication with an associated steam line for distributing incoming steam into the chamber along its entire length. While only chambers 4-6 are shown including these distribution plenums, it is to be understood that each includes at least one.

Returning to FIG. 1, all of the steam lines 68 are shown containing respective valves 72 which operate between open and closed positions. When each of these valves is in its closed position, its associated steam line is closed and therefore no steam reaches the associated chamber. On the other hand, when each valve is opened, its steam line automatically directs steam into the appropriate chamber. For reasons to become apparent below, these valves are preferably electrically actuated solenoid valves, although they could be of any other type which operate in the controlled fashion to be described.

In order to independently maintain the cooking chambers 1-6 at individual preset temperatures, each includes suitable means for sensing the temperature therein. A readily available thermostat having a temperature sensing element 74 and temperature adjusting component 76 will suffice. As illustrated in FIG. 1, the sensing element of each theremostat is fixedly mounted within a corresponding chamber and its associated temperature adjusting component may be mounted to a suitable control panel 78 forming part of housing 12. Means generally indicated at 80 may be provided in cooperation with each thermostat for visually indicating the actual temperature within its associated chamber. In any event, suitable and readily providable control means are provided for operatively connecting the thermostat associated with each chamber to the corresponding valve 72 so that the latter operates in the manner described immediately below.

So long as the temperature within any given chamber remains at the preset valve selected by the thermostat, its associated valve remains closed, thereby preventing any steam from entering the chamber. Should the chamber temperature go below its preset value, the valve is automatically opened and steam from boiler 66 automatically enters the chamber raising the temperature therein until it again reaches the preset level, at which time the valve is again closed. In other words, steam is directed into each chamber only so long as the temperature in that chamber is below the preset level. This is to be contrasted with the typical prior art steamer disclosed previously in which steam is continuously directed into its cooking chamber. The present approach more rapidly and reliably controls chamber temperatures and, unlike the prior art technique, can easily control different chambers at different temperatures and can rapidly make substantial changes in temperature within any given oven. This may be important for example if what is normally a bun chamber is needed for use as a hot dog chamber or vice versa. Utilizing the temperature values described previously, this requires a change of 13° which can be made rapidly and in an uncomplicated way by the present technique, whereas it cannot be done in a rapid fashion utilizing the previously described approach since this latter approach requires that the entire supply of boiling water be either raised by 13° or reduced by 13° which is normally slow process.

Having described overall assembly 10 and the way in which it functions, the particular way in which hot dogs and buns are steam heated (or cooked) should be apparent. It should be equally apparent that the assembly itself could be utilized for steam heating and/or cooking other food products and that the assembly itself could include any number of chambers and different types of structural means serving as ramps 32. Moreover, while the entry and exit doors for each chamber have been shown on opposite sides of the assembly housing and while this is preferred, the two could be provided on the same side of the housing. In this latter case, the exit door would still be provided vertically lower than the entry door. However, rather than having a ramp which defines a straight line path, the ramp would be designed along a curved path, actually U-shaped in configuration as diagrammatically illustrated in phantom lines in FIG. 3. In other words, the ramp would extend downward from the entry door along a U-shaped path and back towards the lower exit door. In this way, an individual operator can oversee both ends of the given chamber at the same time. However, in order for the trays to make these U-shaped turns, their wheels will have to turn or ball bearings or the like could be used. It is also possible to provide the entrance door into each chamber from the top of the housing, although this might require a more complicated ramp or tray guidance configuration. Moreover, all of the entry doors could be provided on one side of the housing and the exit doors on the opposite side.

What is claimed is:

1. An assembly for steam heating or cooking a given food product, comprising housing means including a cooking chamber; means for sensing the temperature within said cooking chamber; boiler means including a steam chamber for maintaining a supply of steam under pressure within said steam chamber continuously throughout operation of the assembly; and flow control means connected between said steam chamber and cooking chamber and responsive to said temperature sensing means for directing steam from the supply in said steam chamber into said cooking chamber when the temperature therein is below a preset value, whereby to raise the chamber temperature to said preset value for heating or cooking said food product at that temperature.

2. An assembly according to claim 1 wherein said steam supplying means supplies said steam at a constant temperature at least as high as said preset temperature.

3. An assembly according to claim 2 wherein said steam supplying means includes a boiler defining said steam chamber and having means for boiling water to said constant temperature within said steam chamber whereby to provide said steam at that temperature.

4. An assembly according to claim 1 wherein said flow control means includes a solenoid valve and means for closing said valve when the temperature within said cooking chamber is at or above said preset value and for opening said valve when the temperature within said cooking chamber is below said preset value.

5. An assembly according to claim 1 wherein said housing means includes a first door means for access into said cooking chamber, a second vertically lower door means for access into said cooking chamber, and ramp means located with said cooking chamber and extending downhill from said first door means to said second door means, said assembly including a tray adapted for positioning into said cooking chamber and on said ramp means through either of said door means so as to support said food product within the cooking chamber, said tray also being adapted to move by its own weight down said ramp means from a point adjacent said first door means to a point adjacent said second door means whereby if a tray supporting a given product or products is placed on said ramp means through said first door means it automatically moves towards said second door means for ultimate removal from the cooking chamber.

6. An assembly according to claim 5 wherein said housing means includes opposite vertically extending sides, wherein said first and second door means are respectively disposed on said opposite sides, and wherein said ramp means defines a straight line path between said first and second door means.

7. An assembly according to claim 5 wherein said housing means includes a vertically extending side, wherein said first and second door means are both disposed on said side and wherein said ramp means defines a curved path between said first and second door means.

8. An assembly according to claim 5 wherein said carriage includes a tray like body carried by a plurality of rotatable wheels adapted to roll on said ramp means.

9. An assembly according to claim 5 wherein said given food product includes hot dog buns and wherein said tray includes a tray-like support including at least a flat upwardly extending surface and means for supporting said bun at points along the latter above said surface, whereby to prevent the buns from coming in contact with water on said surface resulting from steam condensing thereon.

10. An assembly according to claim 1 wherein said housing means includes a first door means for access into said cooking chamber, a second vertically lower door means for access into said cooking chamber, and means located within said cooking chamber for guiding a tray through said cooking chamber from said first door means to said second door means, said assembly including said carriage which is adapted for positioning into said cooking chamber through said first door means so as to support said food product within the cooking chamber, said tray cooperating with said guide means for moving through said cooking chamber to said second door means so as to be removed from said cooking chamber through the latter.

11. An assembly for steam heating hot dogs and buns, comprising: a housing including a plurality of separate cooking chamber; means for independently but simultaneously sensing the temperature within each of said chambers; boiler means including a steam chamber for maintaining a single supply of steam under pressure within said steam chamber continuously throughout operation of the assembly, and steam being maintained at a predetermined constant temperature; and flow control means connected between said steam chamber and cooking chambers and responsive to the temperature within each chamber for directing steam from the supply to any one of the chambers independent of the other chambers when the temperature within that chamber goes below a preset value no greater than the temperature of said steam, whereby all of the chambers are maintained at preset temperature values for heating the hot dogs or buns therein.

12. An assembly according to claim 11 wherein certain ones of said cooking chambers are adapted for heating hot dogs and others are adapted for heating buns and wherein the preset temperature of each of the cooking chambers adapted to heat the hot dogs is 195° F. and the preset temperature of each of the cooking chambers adapted to heat buns is 208° F.

13. An assembly according to claim 11 wherein said steam supplying means includes a boiler defining said steam chamber and having means for boiling water to said constant temperature, wherein said temperature sensing means includes independent thermostats respectively disposed within said plurality of cooking chamber, and wherein said flow control means includes plumbing between said steam chamber and each of said cooking chambers for directing said steam from said boiler to each of said cooking chambers, said plumbing including an independently operated valve for each of said cooking chambers, each valve cooperating with the thermostat in its associated cooking chamber for opening the supply of steam to that chamber when the temperature therein goes below its preset value.

14. An assembly for steam heating or cooking a given food product comprising: a plurality of separate trays, having plate-like main bodies and wheel means supporting said main bodies for rolling movement, each of which is adapted to support one or more of said food products; housing means including an internal cooking chamber sufficiently large to receive all of said trays simultaneously, a first door means for passing said trays into said chamber, one at a time, second vertically lower door means for passing said trays out of said chamber, one at a time, and means located within said chamber and extending between said first and second door means for guiding said trays, one at a time, through said chamber from said first door means to said second door means, said guide means including ramp means extending downhill from said first door means to said second door means for supporting said trays, one at a time, such that each of the latter moves by its own weight down the ramp means from said first door means to said second door means; and means for heating said chamber.

15. An assembly according to claim 14 wherein said housing means includes opposite vertically extending sides, wherein said first and second door means are disposed on said opposite sides, and wherein said ramp means defines a straight line path through said chamber between said first and second door means.

16. An assembly according to claim 14 said housing means includes a vertically extending side surface, wherein said first and second door means are disposed in said side surface and wherein said ramp means defines a curved path within said chamber between said first and second door means.

17. An assembly according to claim 14 wherein said given food product includes a package of hot dog buns and wherein said main body includes a substantially flat top surface and means for supporting said package of buns above said top surface.

18. A method of steam heating or cooking given food products, comprising the steps of: providing an oven having an internal chamber, inlet door means into said chamber, vertically lower outlet door means out of said chamber, and ramp means in said chamber extending between said inlet and outlet door means for guiding a plurality of support trays between said inlet and outlet door means, one at a time; providing a plurality of support trays supported on wheels and placing a plurality of said food products on each of said trays; thereafter placing said trays, one at a time, into said chamber through said inlet door means in cooperation with said ramp means so as to cause said trays and the food products supported thereby to move through said chamber, one at a time, from said inlet door means to points adjacent said outlet door means by their own weight; while said trays are in said chamber, heating the food products thereon; and removing said trays and supported food products from said chamber through said outlet door means, one at a time, in the order in which the trays were placed into said chamber.

19. A method of steam heating or cooking a given food product, comprising the steps of: providing housing means including a cooking chamber and a separate steam chamber; placing said food product in said cooking chamber; and controlling the temperature within said cooking chamber in a way which cooks the food product in the desired manner, the temperature within said cooking chamber being controlled by continuously maintaining a supply of steam under pressure within said steam chamber at a certain temperature throughout the heating or cooking operation, continuously sensing the temperature within the cooking chamber throughout said operation and, in the event the temperature within said cooking chamber falls below a desired value which is equal to or less than said certain temperature, causing steam from said steam chamber to enter said cooking chamber until the temperature within the latter chamber increases to the desired value at which time steam is no longer directed from said steam chamber to said cooking chamber.

20. A method according to claim 19 wherein the desired temperature within said cooking chamber is less than said certain temperature of said steam.

* * * * *